Sept. 11, 1934.                J. F. BLESER                1,973,555
ANTIFRICTION DEVICE Original Filed Dec. 15, 1930

Witness:
William P. Kilroy

Inventor
Joseph F. Bleser
By Hill & Hill
Attys.

Patented Sept. 11, 1934

1,973,555

UNITED STATES PATENT OFFICE 1,973,555

ANTIFRICTION DEVICE

Joseph F. Bleser, Springfield, Ill.

Original application December 15, 1930, Serial No. 502,429. Divided and this application August 28, 1931, Serial No. 559,855

3 Claims. (Cl. 308—212)

This invention relates to anti-friction devices and particularly to bearings of the roller type, in which a plurality of rollers are suitably positioned between and substantially uniformly spaced around relatively movable portions of the bearing structure for reducing to a minimum any friction due to the relative movement of said portions.

One object of the present invention is to provide a bearing of the character described which is particularly adapted to be readily and conveniently positioned between relatively fixed supports.

Another object of the invention is to provide a bearing structure which may be readily assembled and disassembled for making repairs, cleaning or other purposes.

Another object of the invention is to provide a bearing of simple construction and containing a minimum number of parts.

A further object of the invention is to provide a bearing that is strong, durable and which may be economically manufactured.

A still further object of the present invention is to improve devices of the character described in sundry details hereinafter referred to and particularly pointed out in the appended claims.

The present application is a division of my copending application for improvement in Pistons, filed December 15, 1930, Serial No. 502,429.

Figure 1:
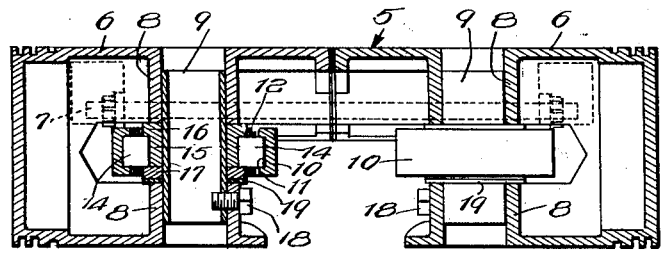
Figure 2:
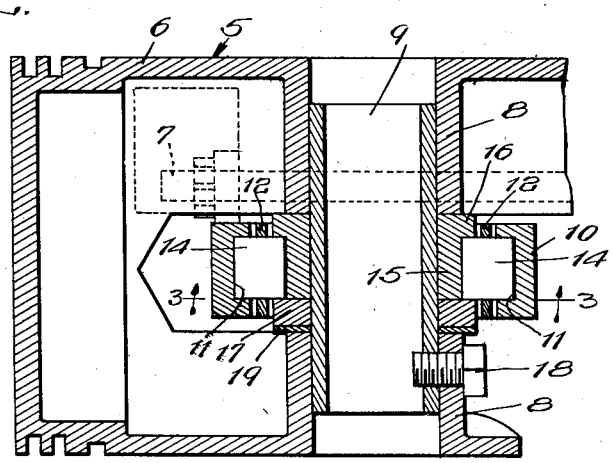
Figure 3:
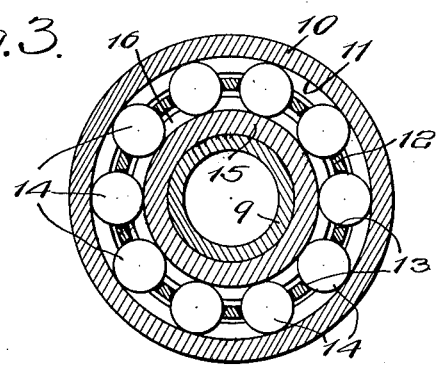

One embodiment of the present invention is shown for illustrative purposes in the accompanying drawing, in which Fig. 1 is a longitudinal sectional view of a two-piece double end piston illustrating the application of my improved anti-friction device thereto;

Fig. 2 is an enlarged sectional view of one of the bearing structures illustrated in Fig. 1, and Fig. 3 is a sectional view taken substantially as indicated by the line 3—3 of Fig. 2.

The illustrative embodiment of the present invention is shown applied to a two-piece double end piston of the type forming a part of the invention fully described and claimed in my copending application above referred to, and as the engine structure shown and described therein, to which the type of piston shown is particularly adapted, forms no part of the present invention, only so much of the structures of the copending application is shown herein as is thought necessary to obtain a clear understanding of the present invention.

In the arrangement shown in the drawing, my improved bearing is shown applied to a double end piston indicated as a whole by the numeral 5 and comprising substantially hollow end portions 6 secured together by means of longitudinally extending bolts 7, each of the portions 6 having inwardly extending aligned hollow supporting bosses 8 adapted to receive and support a shaft or wrist pin 9 on which my improved bearing is adapted to be mounted, the bearing structure being adapted to be positioned on the shaft or wrist pin 9 between adjacent ends of the bosses 8 formed on the respective end portion 6.

In the construction shown, the present invention comprises preferably a one piece rotatable annular member 10 of substantially U-shaped cross section having a channel 11 formed in its inner side and providing a strong, sturdy outer race for a plurality of bearing rollers, and suitably positioned within the member 10 is a retainer 12 having a plurality of annularly spaced radially disposed apertures 13 formed therein adapted to receive a plurality of bearing rollers 14 in a manner to annularly space the rollers and to permit a portion of their outer sides to extend into the channel 11, and the opposite or inner sides of the rollers to protrude or extend inwardly from the inner face of the retainer, thereby providing an outer race for the rollers 14 in the annular channel 11 of the member 10.

Positioned within the circle formed by the inner faces of the rollers 14 is a relatively stationary bearing cone 15 having an outwardly extending annular flange 16 formed on one end thereof adapted to engage one of the end portions of the rollers 14, and at the opposite end of the cone is a ring 17 surrounding the shaft 9 and adapted to engage the opposite end portions of the rollers 14.

For supporting the bearing cone 15 and ring 17 between the adjacent ends, the bosses 8 of the end portions 6, the hollow shaft or wrist pin 9 is adapted to be positioned in the bosses 8 and to extend through the ring 17 and cone 15, the shaft or wrist pin 9 being secured against rotation and endwise movement in the bosses by means of set screws 18.

It will be observed from the foregoing description that in the arrangement shown, the cone 15 and ring 17 are positioned on the shaft or wrist pin 9 between adjacent ends of the bosses 8 in a manner to be secured against longitudinal movement on the wrist pin by the end portions of the bosses, and that by reason of the inner sides of the rollers 14 being positioned between the flange 16 and ring 17, and the outer sides of the rollers being positioned within the channel 11 of the member 10, the member 10 and cone 15 are secured against relative displacement longitudinally of the shaft 9, and that the various parts constituting the improved bearing are retained in operative position with respect to each other simply by the adjacent ends of the bosses 8. Thus it will be observed that by merely removing the set screw 18 and the shaft 9, the entire bearing construction may be readily removed from its mounting and disassembled for making repairs, cleaning or other purposes.

To facilitate the positioning of the bearing structure within the end portion 6, it may be found desirable to form the cone 15 and ring 17 with a total longitudinal dimension somewhat less than the distance between adjacent ends of the bosses 8, in which case, one or more spacing washers 19 may be positioned between the ring 17 and the adjacent end of one of the bosses 8, or between the flanged end of the cone 15 and the adjacent end of the other boss, thereby providing suitable means for positioning the bearing structure longitudinally of the shaft 9 as may be found desirable.

It will be observed from the foregoing description that the present invention provides a novel and efficient bearing construction which may be readily and conveniently positioned between relatively fixed shaft supports, and which may be readily assembled, and disassembled for making repairs, cleaning or other purposes, and which by reason of the spacing washers may be adjusted in various positions longitudinally of the shaft between its supports.

Obviously the present invention is not limited to the precise construction and arrangement shown and described, as the same may be variously modified. Moreover, all the features of the invention need not be used conjointly, as the same may be used to advantage in variously different combinations and subcombinations.

What I claim as new and desire to cover by Letters Patent is:

1. In a device of the class described, the combination of a shaft, an annular member having an inwardly faced annular groove formed therein, a plurality of anti-friction elements portioned in the said groove, a bearing cone mounted on said shaft and extending entirely across the face of said elements between the shaft and the elements, an integral annular flange adjacent one end of said cone, and retaining means separate from the cone adjacent the opposite end thereof and engageable with said anti-friction elements.

2. In a device of the class described, the combination with a shaft and relatively fixed supports therefor, of an annular member having an internal angular groove formed therein, a plurality of annularly spaced rollers in said groove, a bearing cone mounted on said shaft between said supports and extending entirely across the face of said rollers, said cone having an integral annular flange adjacent one of its end portions engageable with one of the ends of said rollers, and a separate thrust ring surrounding said shaft between the opposite end of said cone and one of said supports and engageable with the opposite ends of said rollers.

3. In a device of the class described, the combination with a shaft and spaced relatively fixed supports therefor, of an annular member of substantially U-shaped cross section having an internal annular groove formed therein, a plurality of rollers in said groove, means for spacing said rollers annularly therein, a bearing cone mounted on said shaft extending across the faces of said rollers between said supports and having an integral annular flange adjacent one of its end portions and engageable with one of the ends of said rollers, a thrust ring separate from the cone and mounted on said shaft between the opposite end portion of said cone and one of said suppports, said ring being engageable with the opposite ends of said rollers, and a spacing washer on said shaft adjacent one of said supports.

JOSEPH F. BLESER.